United States Patent [19]

Kingstone

[11] Patent Number: 5,617,496
[45] Date of Patent: Apr. 1, 1997

[54] LATERAL ILLUMINATION FIBER OPTIC CABLE DEVICE AND METHOD OF MANUFACTURE

[75] Inventor: Brett M. Kingstone, Orlando, Fla.

[73] Assignee: Super Vision International, Inc., Orlando, Fla.

[21] Appl. No.: 277,887

[22] Filed: Jul. 20, 1994

Related U.S. Application Data

[63] Continuation of Ser. No. 65,942, May 21, 1993, Pat. No. 5,333,228.

[51] Int. Cl.$^6$ ........................................... G02B 6/44
[52] U.S. Cl. ........................... 385/100; 385/136; 385/901
[58] Field of Search ..................................... 385/100, 136, 385/901, 108

[56] References Cited

U.S. PATENT DOCUMENTS

| | | | |
|---|---|---|---|
| 4,226,504 | 10/1980 | Bellino | 385/104 |
| 4,375,313 | 3/1983 | Anderson et al. | 385/103 |
| 4,496,214 | 1/1985 | Oestreich et al. | 385/103 |
| 4,593,973 | 6/1986 | Yoshida et al. | 385/126 |
| 4,645,298 | 2/1987 | Gartside | 385/106 |
| 4,703,998 | 11/1987 | Uchioke et al. | 385/105 |
| 4,783,953 | 11/1988 | Akre | 385/106 |
| 4,820,014 | 4/1989 | Nishimura et al. | 385/105 |
| 4,875,215 | 10/1989 | Hughes | 385/100 |
| 4,997,258 | 3/1991 | Oestreich | 385/105 |
| 5,155,789 | 10/1992 | Le Noane et al. | 385/106 |
| 5,222,177 | 6/1993 | Chu et al. | 385/103 |
| 5,268,971 | 12/1993 | Nilsson et al. | 385/103 |
| 5,268,983 | 12/1993 | Tatarka et al. | 385/103 |
| 5,389,442 | 2/1995 | Arroyo et al. | 385/103 |

*Primary Examiner*—Rodney B. Bovernick
*Assistant Examiner*—Robert E. Wise
*Attorney, Agent, or Firm*—James H. Beusse

[57] ABSTRACT

A fiber optic cable (10) suitable for lateral illumination lighting installations has a tubular central core (12), wrapped perimetrically with angularly evenly distributed bundles (15) of optical fibers (16) and covered with a transparent sheath (17). The core includes an outer cylindrical surface (14) of reflective material (24) that deflects inwardly directed lateral emissions back outwardly, so they can contribute usefully to the visible light. In manufacture, the bundles are wound about the core by a cabling machine which simultaneously extrudes the sheath about the winding. In a modified embodiment, a cable (10') includes an arcuate cutout (30) that mates with a complementary track (39, 40) of a mounting strip (35). Strip (35) includes a reflective substance in an area (38) between upper and lower cables (10') to present a continuous, top to bottom lateral illumination effect. In another form of the modified embodiment, the fiber bundles are provided directly within upper and lower reflective channels (41) formed integrally within the mounting strip.

4 Claims, 2 Drawing Sheets

LATERAL ILLUMINATION FIBER OPTIC CABLE DEVICE AND METHOD OF MANUFACTURE

This is a continuation of application Ser No. 08/065,942, filed May 21, 1993, now U.S. Pat. No. 5,333,228.

This invention relates to fiber optic lighting, in general; and, in particular, to an improved fiber optic cable providing illumination through lateral transmission of light, and to a method of manufacture thereof.

BACKGROUND OF THE INVENTION

An "optical fiber" is an elongated glass or plastic filament having a core region surrounded by one or more layers of cladding, with the core having a higher index of refraction than the cladding, so that light introduced at one end of the fiber will be internally reflected for transmission longitudinally within the core channel, to the other end of the fiber. A "fiber optic cable" comprises a sheath surrounding a multiplicity of optical fibers. For further details on optical fibers, see, e.g., U.S. Pat. No. 4,744,631, the disclosure of which is incorporated herein.

In addition to transmitting light in a longitudinal mode, conventional fiber optic cable also transmits light laterally. For data communications, an effort is made to minimize such lateral transmission; however, the lateral illumination is useful for area lighting or spotlighting, such as around swimming pools, walkways, signs, and other safety and decorative accent lighting applications. Attempts have been made in this context to maximize lateral emissions to provide uniform sideways lighting or "glow" over the length of the cable.

Examples of lateral illumination fiber optic cable devices used for safety or decorative illumination purposes are given in U.S. Pat. Nos. 4,933,815 and 4,763,984, the disclosures of which are incorporated herein. Such fiber optic cables or light channels utilize special methods of fabrication, such as the inclusion of actinically-sensitive dyes or other light-scattering materials in the core, to aid in enhancing lateral scattering of the incident light flux.

Other approaches, which do not require specially fabricated fibers, simply bundle large numbers of fibers over each other, either individually or in helically wound groups, and cover the same with a clear plastic jacket or cable. Such bundles are not efficient from the aspect of cost and illumination. The central fibers in the cable are wasted due to the fact that the central core of fibers in such cables does not contribute to the visible illumination. Moreover, the central fibers may actually detract from the lateral mode transmissions of the perimetric fibers by causing absorption and attenuation of the light directed toward the center.

SUMMARY OF THE INVENTION

It is an object of the present invention to provide an efficient and cost-effective lateral illumination fiber optic cable device wherein the wasted central core placement of optical fibers is eliminated.

It is a further object of the invention to provide a lateral illumination fiber optic cable device wherein light directed inwardly from the perimetric fibers is re-deflected outwardly.

it is yet another object of the invention to provide a lateral illumination fiber optic cable device having convenient means for mounting a length of fiber optic cable to a supporting structure.

In accordance with one aspect of the invention, a fiber optic cable has a multiplicity of optical fibers located perimetrically in an annular region between a reflective tubular central core and an outer transparent tubular sheath. In one arrangement, described in greater detail below, the cable has a plurality of bundles of fibers, uniformly distributed at equiangular intervals about a tube covered with a reflective tape or coating. In a second arrangement discussed below, a plurality of such cables are provided with arcuate cutouts and hollow core regions which fit over complementary projections of corresponding attachment tracks of lineally extending reflective mounting strips. A method of manufacturing the cable includes cabling, wrapping or winding the bundles of fibers about the perimeter of a tubular core, while passing the same through an extruder to apply a clear plastic jacket or sheath thereover. The sheath material is injected with a UV stabilizer during manufacture to protect the cable from yellowing due to the sun, and a clear protective cape is used around the bundles to prevent the fibers from being melted during the extrusion process.

The improved perimetrical arrangement eliminates the need for wasted central core fibers and the reflective central core of the improved cable serves to deflect inwardly directed laterally transmitted light back out towards the perimeter of the cable, thereby enhancing the brightness of the cable while reducing the number of fibers needed to produce the same diameter cable.

In accordance with another aspect of the invention, pluralities of pregrouped bundles of fibers are inserted through interior channels formed directly along the front surface of lineally extending reflective mounting strips. In a third arrangement discussed below, bundles of fibers are collected into upper and lower groupings, the groupings are respectively covered with clear protective capes, and then the caped groups are passed through an extruder which forms the mounting strip about the groupings. The resultant fiber-filled strip offers the advantages of the second arrangement; however, in a single unitary structure.

BRIEF DESCRIPTION OF THE DRAWINGS

Embodiments of the invention have been chosen for purposes of illustration and description, and are shown in the accompanying drawings, wherein:

FIG. 3 is a fragmentary perspective view, in section, showing a modified embodiment of the cable device of FIG. 1, employed in a track lighting system.

Throughout the drawings, like elements are referred to by like numerals.

DETAILED DESCRIPTION OF PREFERRED EMBODIMENTS

Figure 1:
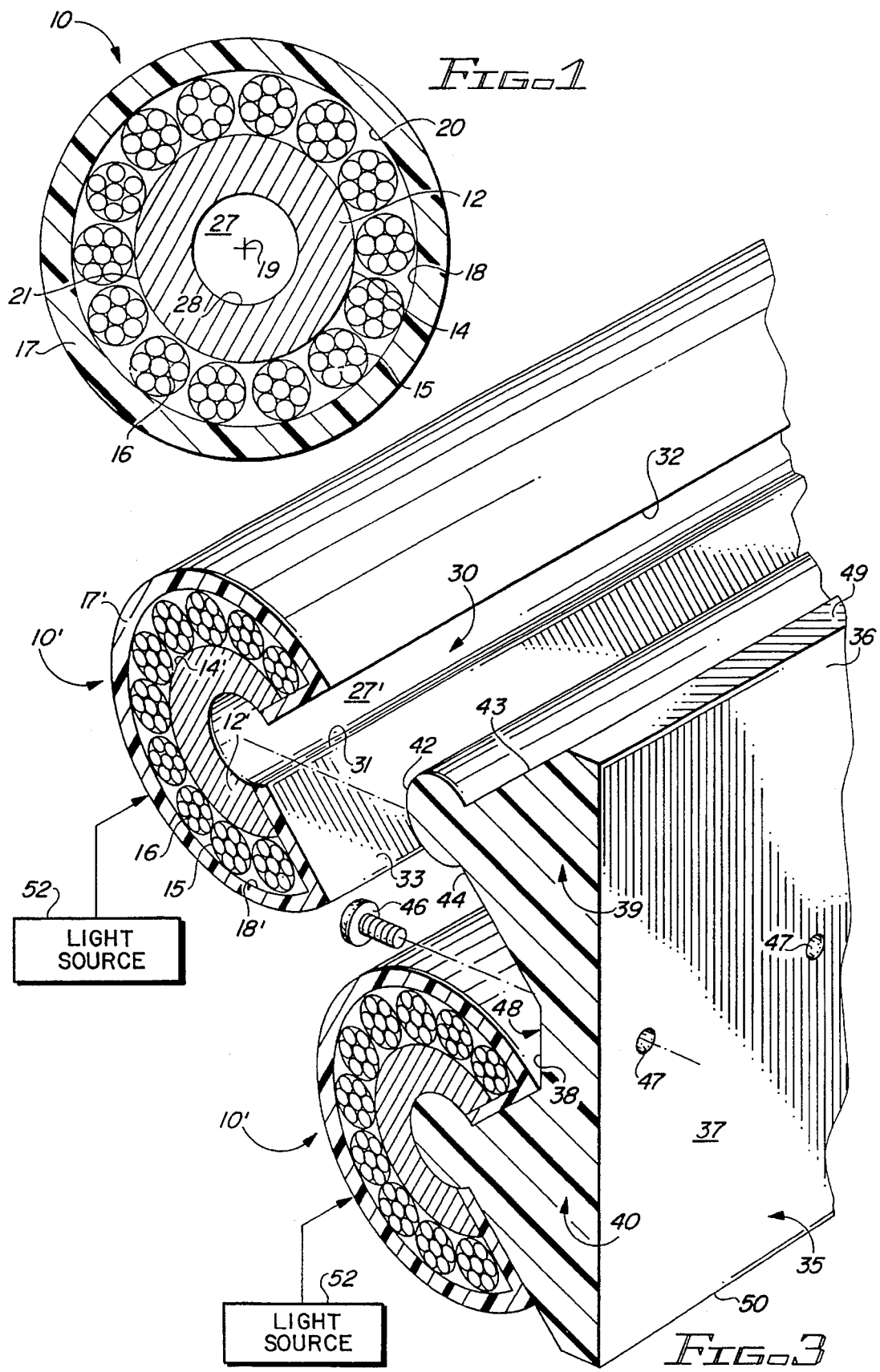
FIG. 1 is a cross-section view of a lateral illumination fiber optic cable device in accordance with one embodiment of the present invention.

As shown in FIG. 1, a lateral illumination fiber optic cable device 10 includes a central core in the form of a longitudinally extending, hollow circular tube 12 having a cylindrical outer surface 14. The tubing is made of a reflective material, coated, or otherwise associated to impart light reflectance to the surface 14. A plurality of prepackaged bundles 15 of optical fibers 16 is uniformly distributed circumferentially about the perimeter of the core 12 to extend axially in contact with the reflective surface 14.

The bundles 15 are, in turn, covered with a clear plastic tubing or casing sheath 17 which has an inside cylindrical surface 18 in contact with the radial extremities of the bundles 15. The sheath 17 runs longitudinally, coaxially of the tubing 12, with the bundles being evenly angularly distributed about a common longitudinal axis 19 in an annular region formed in the space between the surfaces 14, 18. The bundles 15 may be laid straight, or helically wound about core 12, in the axial direction.

In a typical application, a length of cable 10 will be mounted around a swimming pool, walkway, sign or similar structure, and illuminated by coupling light flux into one or both ends using a light source, such as one of the type generally described in U.S. Pat. Nos. 4,825,341; 4,922,385 and 5,016,152, the disclosures of which are incorporated herein. Each cable end to be illuminated is stripped back to remove like lengths of sheath 17 and core 12, leaving the remaining bundle ends to be gathered together for efficient light input. Unlike prior art cables, wherein laterally transmitted, inwardly directed light is attenuated and "lost" within the cable center light emitted inwardly by the fibers 16 of the device 10 will be reflected by the surface 14, out towards the perimeter of the cable 10. There is, thus, no necessity to fill the core region with fibers, as done conventionally. On the contrary, the action of reflection at surface 12 enhances the brightness of the "glowing" cable, while reducing cost compared to equal diameter conventional cables which needlessly fill the core with additional fibers.

In a preferred embodiment of manufacture, commercially available bundles 15 of helically-twisted fibers 16 are cabled, wrapped or wound over a white or silver reflective PVC plastic tubing 12, then passed through a plastic extruding machine, which will lay a clear PVC plastic tubing jacket 18 over the bundle-wrapped core to serve as a protective outer shell. In the preferred embodiment, a UV stabilizer is injected into the tubing 18 as it is being formed to protect the cable from yellowing die to the rays of the sun, and a cape 20 of clear Mylar™ or Teflon™ is wound around the outside diameter of the bundle layer, to keep the bundles 15 from unraveling during the cabling process and to prevent the fibers 16 from being melted during the process of extruding the jacket 18 over the bundle wrapping. For enhancement of the reflectance, or as an alternative to using a reflective tubing material, the surface 12 may be wrapped with a layer of aluminum foil or Mylar™ (foil-side out) tape 21, or coated with $TiO_2$ or white reflective paint.

Figure 2:
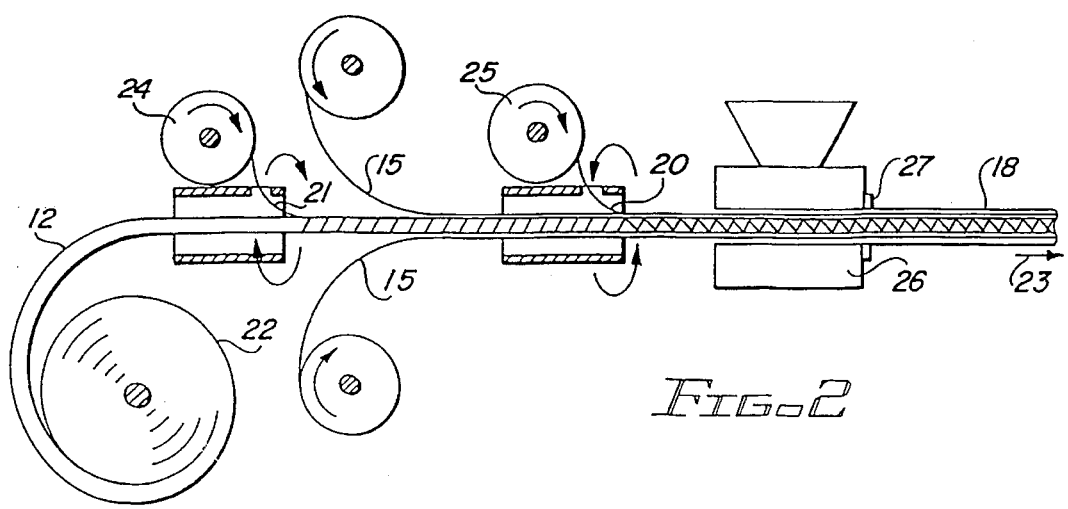
FIG. 2 is a schematic view of a manufacturing process suitable for forming the cable device of FIG. 1.

One approach to implementing the manufacturing process is illustrated in FIG. 2. A length of hollow tubing 12 is drawn off a roll 22 and fed in an axial direction 23. A tape dispenser 24 is rotated about tubing 12 to wrap a length of reflective tape 21 helically about tubing 12. A plurality of fiber bundles 15 are then laid longitudinally, at equiangular intervals, along the reflective tape covered tubing. A second tape dispenser 25 is then rotated about tubing 12, in a direction counter to the rotation of dispenser 24, to wrap a length of clear protective tape 20 helically about the bundled tubing 12. The protective tape-wrapped tubing is then fed centrally through an extruder 26 having a die 27 which forms a jacket 18 over the bundle wrapping, thereby producing the finished cable 10.

For manufacture of a 0.580" 98-element fiber optic cable, core 12 can suitably be constituted by a 0.312" OD×0.156" ID PVC tube; sheath 17 can be a 0.040" dia. transparent PVC jacket; and bundles 15 can comprise 14 evenly distributed bunches of 7×0.030" fiber optic elements. Utilizing a central core of reflective material, the fibers are efficiently placed, so that their contributions to the externally visible illumination are not wasted by being lost due to placement in the central core region.

The hollow 27 of tubs 12 is left devoid of fibers currently contributing to the visible lateral illumination. Hollow 27 may, however, be optionally utilized to extend electrical wiring to remote light sources, to extend fibers to carray light to serially mounted cables or signalling devices, or for other similar conduit purposes. Where light is to be communicated by longitudinal transmission through hollow 27, the inside surface 28 of the 12 may also be made reflective. Such treatment will reflect lateral emissions back to the internally located fibers to enhance longitudinal transmission through the shielded center of the core region.

FIG. 3 shows a modified arrangement 10' of cable device 10, wherein an arcuate segment cutout 30 of approximately 90° has been made cross-sectionally, to run the entire length of the cable 10'. Cutout 30 provides a longitudinal opening 31 into the hollow 27' of the tubing 12'. The opening 31 is bounded by radially directed walls 32, 33 which are formed by inwardly directed flanges of a C-shaped cross-sectioned transparent sheath 17'. Bundles 15 of fibers 16, identical with those of cable 10 fill the arcuate annular region formed in the spacing between the outside surface 14' of tube 12' and the inside surface 18' of sheath 17'. For the example shown, the space is filled by 70 fibers constituted by 10 bundles of seven fibers each.

In accordance with a further aspect of the invention, a longitudinally extending moutning strip 35 has a base 36 with a vertically planar rear surface 37 and a front surface 38 having forwardly projecting spaced upper and lower attachment tracks 39, 40 protruding therefrom and running longitudinally therealong. Track 39 includes a triangular cross-section having a circular protuberance 42 at its apex. Sides 43, 44 of the triangle of track 39 complement the radially-directed walls 32, 33 of cutout 30, and protuberance 42 complements the diameter of hollow 27', so that the length of cabling 10' can be snap-fit onto track 39 to secure the same to the mounting strip 35. Track 40 is identically formed to receive a second length of cable 10' in snap-fitting relationship similarly thereon.

Track 35 can be positioned as desired around a swimming pool, walkway, sign, or other structure to be illuminated or accented by lateral fiber optic lighting. Fasteners 46 may be passed through bores 47 located in axially-spaced placements intermediate the tracks 39, 40, in order to secure the strip 35 in position. The space 48, exposed on front surface 38 between tracks 39, 40 after mounting respective cables 10' thereon, may be made of or coated with a reflective substance to provide the effect of continuous lateral illumination from the top edge 49 to the bottom edge 50 along the strip 35. As with cable 10, one or more light sources 52 are directed axially into one or both ends of each cable 10'.

Figure 4:
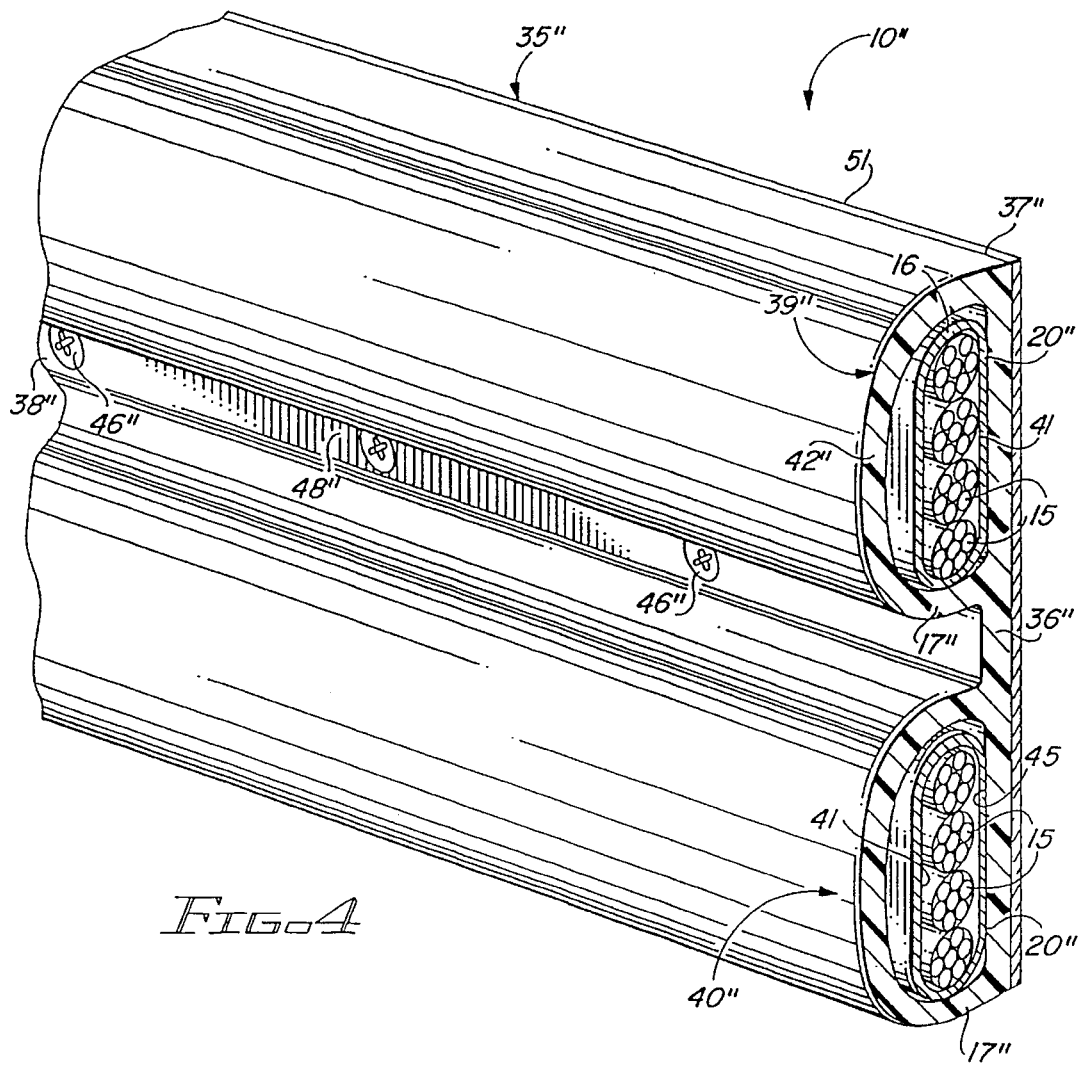
FIG. 4 is a fragmentary view, in section, of another form of the modified embodiment of FIG. 3.

FIG. 4 illustrates another cable device 10" similar to device 10' of FIG. 3, but which integrates the functions of core 12' and sheath 17' in a modified mounting strip 35". Strip 35" has a base 36" with a vertically planar rear surface 37" and a front surface 38" having spaced upper and lower tracks 39", 40" protruding therefrom and running longitudinally therealon. Each track 39", 40" comprises an arcuate segment 42" defining an interior longitudinally extending channel 41 through which a plurality of pregrouped bundles 15 of fibers 16 are inserted. The rear surface 45 of each channel 41 is made reflective, as is the spacee 48" exposed on the front surface 38" between tracks 39", 40". This can be done by using a clear material for the strip 35" and applying a reflective substance over the surfaces 45 and space 48" or, as shown, by applying a reflective material, such as a metallic foil backing 51, over the surface 35". The device 10" can be readily manufactured by collecting bundles 15 into upper and lower groupings, wrapping a clear protective covering 20" over the separate bundle groupings, then passing the same through an extruder which forms the mounting strip profile about the groupings. In this case, the rear surfaces 45 of the channels 41 serve the purpose of the reflective core 12", and the segments 42" perform the role of the casing sheath 17".

Though the cable devices 10, 10', 10" are shown filled with fibers 16 prewound into bundles 15, it will be understood that the same devices can be achieved using individual unbundled fibers, if preferred. Moreover those skilled in the art to which the invention relates will appreciate that other substitutions and modifications can also be made to the described embodiments, without departing form the spirit and scope of the invention as encompassed by the claims below.

What is claimed is:

1. A lateral illumination fiber optic cable comprising:

a central core extending longitudinally of the cable;

a plurality of optical fibers distributed perimetrically about the core and extending axially along an outer surface of the core, said optical fibers having a plurality of bends in the fibers for enhancing lateral illumination at the expense of axial transmission of light; and a transparent tubular sheath encompassing the core and the optical fibers and extending along a length of the cable.

2. The lateral illumination fiber optic cable of claim 1 wherein the optical fibers are wound about the core in overlapping patterns to form variable lateral illumination designs.

3. The lateral illumination fiber optic cable of claim 1 wherein the optical fibers are bundled into a plurality of bundles and the bundles are distributed about the core.

4. The lateral illumination fiber optic cable of claim 1 wherein said central core comprises a length of a flexible, memory retentive material enabling said cable to be bent into selected shapes which are maintained by said core.

* * * * *